United States Patent
Ergen et al.

(10) Patent No.: US 8,275,400 B2
(45) Date of Patent: Sep. 25, 2012

(54) METHOD AND SYSTEM FOR SMS BASED TICKET NUMBER SERVICE OVER FEMTOCELL ACCESS POINT

(75) Inventors: Mustafa Ergen, Oakland, CA (US); Tushar Shah, Cupertino, CA (US); Rafi Assilian, San Carlos, CA (US); Singaraselvan Singaravelan, Cupertino, CA (US); Oguz Oktay, San Jose, CA (US)

(73) Assignee: Argela-USA, Santa Clara, CA (US)

( * ) Notice: Subject to any disclaimer, the term of this patent is extended or adjusted under 35 U.S.C. 154(b) by 80 days.

(21) Appl. No.: 12/814,934

(22) Filed: Jun. 14, 2010

(65) Prior Publication Data

US 2010/0317380 A1    Dec. 16, 2010

Related U.S. Application Data

(60) Provisional application No. 61/268,592, filed on Jun. 15, 2009.

(51) Int. Cl.
*H04W 88/02* (2009.01)

(52) U.S. Cl. ........................ 455/466; 455/446

(58) Field of Classification Search .................. 455/466, 455/446, 63.1; 370/338
See application file for complete search history.

(56) References Cited

U.S. PATENT DOCUMENTS

| | | | |
|---|---|---|---|
| 6,289,214 B1 | 9/2001 | Backstrom | |
| 6,374,102 B1 | 4/2002 | Brachman et al. | |
| 6,643,505 B1 | 11/2003 | Kamperschroer | |
| 6,807,431 B2 | 10/2004 | Sayers et al. | |
| 6,947,405 B2 | 9/2005 | Pitcher et al. | |
| 7,012,903 B1 | 3/2006 | Amim et al. | |
| 7,239,881 B2 | 7/2007 | Lekutai | |
| 2008/0076419 A1 | 3/2008 | Khetawat et al. | |
| 2008/0207269 A1 | 8/2008 | Byrne et al. | |
| 2009/0129349 A1 | 5/2009 | Osborn | |
| 2009/0156208 A1 | 6/2009 | Vesterinen et al. | |
| 2009/0285166 A1* | 11/2009 | Huber et al. | 370/329 |
| 2009/0286510 A1* | 11/2009 | Huber et al. | 455/410 |
| 2009/0286544 A1* | 11/2009 | Huber et al. | 455/450 |
| 2009/0299788 A1* | 12/2009 | Huber et al. | 705/7 |
| 2010/0027521 A1* | 2/2010 | Huber et al. | 370/338 |

(Continued)

FOREIGN PATENT DOCUMENTS

EP    1243152 B1    10/2008

(Continued)

OTHER PUBLICATIONS

"Report on 'Femtocell Applications Live' at Femtocells World Summit," 3G and 4G Wireless Blog [online], Jun. 24, 2009 [retrieved on Jul. 16, 2009], retrieved from the internet: URL:http://3g4g.blogspot.com/2009/06/report-on-femtocell-applications-live.html.

(Continued)

*Primary Examiner* — Diane Mizrahi
(74) *Attorney, Agent, or Firm* — IP Authority, LLC; Ramraj Soundararajan; Geoff Trotter

(57) ABSTRACT

A Femtocell Access Point (FAP) is used to provision a ticket number service. Customers approach the FAP and are given a ticket number indicating their place in the queue through an SMS message. Follow up SMS messages are sent updating the customer of their current position in line, as well as when it is their turn. Statistics may be generated from information gathered at the FAP and sent to an external client module.

9 Claims, 3 Drawing Sheets

FOREIGN PATENT DOCUMENTS

| WO | 2009012187 | 1/2009 |
| WO | 2009058068 | 5/2009 |
| WO | 2009067196 | 5/2009 |

OTHER PUBLICATIONS

"Airvana to showcase femtocell-based applications at Femtocells World Summit," Airvana [online], Jun. 23, 2009 [retrieved on Jul. 16, 2009], retrieved from the internet: URL:http://www.airvana.com/news/news_898.htm>.

"Femto Forum: Consumer benefits," Femto Forum [online], 2009 [retrieved on Jul. 16, 2009], retrieved from the internet: URL:http://www.femtoforum.org/femto/aboutfemtocells.php?id=87>.

"Femto-Cell, GAN and UTRAN Test Solution," Datasheet [online], Tektronix Communications, [retrieved on Jul. 16, 2009]; retrieved from the internet: URL:http://www.tek.com/products/communications/datasheets/3GCore_CPW-21878.pdf>.

* cited by examiner

METHOD AND SYSTEM FOR SMS BASED TICKET NUMBER SERVICE OVER FEMTOCELL ACCESS POINT

RELATED APPLICATIONS

This application claims priority from U.S. Provisional Application 61/268,592 filed Jun. 15, 2009.

BACKGROUND OF THE INVENTION

1. Field of Invention

The present invention relates to the field of wireless telecommunication networks. In particular, this invention relates to ticket number services offered in a femtocell base station.

2. Discussion of Related Art

The proliferation of number of mobile subscribers and increasing demand for more coverage as well as higher data rate have given rise to deployment of femtocells. Femtocells are small base station just enough to provide indoor coverage. This enhances the quality of communication indoor and operators are able to off load traffic from macro network since they use the customer backhaul to connect femtocells to the operator's network. Hence, reduces their operational expenses since femtocells provide cellular service to mobile subscribers using data service of the user (e.g., DSL, fiberoptic, cable, WiMX, etc). Unlike macro base stations, setup of femtocell is indoor at the customer premises, which requires installation improvements. Also, femtocell is an enabler for location based services (LBS) since they pin-point the location of the mobile subscriber without requiring any other locationing equipment.

The femtocell access point provides wireless communication in an indoor wireless area within a residential enterprise while a service provider may provide wireless communication in a macro area with a macro base station. The femtocell has an interface with one or more wired or wireless ports to establish communication between mobile subscriber and wide area network. Additionally, the femtocell may include one or more processors and memory to implement various services described below.

Femtocell can be connected to operator's core network in several ways. Each standard defines the means of connection and access. For example, in 3G UMTS, industry standard bodies are working on an interface where a co-located architecture of NodeB/BTS and RNC/BSC are placed in femtocell access point (FAP aka Home Node B). There are also two other architecture for 3G; SIP/IMS based architecture, UMA based architecture. Femtocells connect to a femtocell gateway (FGW, aka HNB Gateway). In WiMAX, on the other hand, femtocells have the functionality of macro base station and connect to access service network gateway (ASN-GW).

Femtocells are plenty and unlike macro base stations, which are fewer in number, provisioning and management of femtocells are handled differently. Since it is in the customer premises, femtocell architecture is similar to fixed wire-line broadband networks. The femto forum recommends that Broadband Forum's TR-069 "CPE WAN Management Protocol" and the data model for UMTS femtocell remote management was ratified as TR-196. This way secures CPE auto-configuration and management, including diagnostics and troubleshooting, performance monitoring, and software/image management, is performed on a common framework.

On one side, a femtocell gateway has an interface to femtocells and on the other side, it integrates to operator's packet and circuit services. In other words, FAP GW is a concentrator of control and data traffic of femtocells.

In brief, a femtocell network shall satisfy two dimensions: the ability to maintain quality of communication at carrier-grade level with required infrastructure, and openness to host advance services to enable service providers to capitalize on service differentiation opportunities and streamline operational costs.

U.S. Pat. Nos. 6,289,214 (Backstrom), 6,374,102 (Brachman et al.), 6,643,505 (Kamperschroer), and 7,239,881 (Lekutai), as well as U.S. Patent Application Publications 2008/0207269 (Byrne et al.) and 2009/0156208 (Vesterinen et al.), all describe various femto/picocell systems that use SMS messaging. However, none of these references suggest or imply using SMS messaging to create a ticket number service.

SUMMARY OF THE INVENTION

A method for providing ticket number service through a Femtocell Access Point (FAP) via Short Message Service (SMS), comprising the steps of: (1) receiving a request containing an identifier associated with a subscriber from a subscriber user equipment to attach to the FAP, (2) generating a ticket number indicative of the subscriber's place in a queue for service, and (3) sending an SMS message with the ticket number to the subscriber.

A Femtocell Access Point (FAP) comprising a short range wireless interface that allows communication with a subscriber user equipment, a backhaul network interface that allows communication with a core network, an SMS module that can generate a ticket number indicative of the subscriber's place in a queue for service in response to an attach request from the subscriber user equipment. The SMS module can further send an SMS message with the ticket number to the subscriber.

A method for providing ticket number service through a Femtocell Access Point (FAP) via Short Message Service (SMS) comprising the steps of: (1) receiving a request with a telephone number associated with a subscriber from the subscriber's mobile telephone to attach to the FAP when the mobile telephone is brought within coverage of the FAP, (2) generating a ticket number indicative of the subscriber's place in a queue for service, (3) sending a message comprising said telephone number and said ticket number to an external client module, (4) sending an SMS message with the ticket number to the subscriber, (5) sending periodic update SMS messages comprising updated indications of the subscriber's position in the queue, and (6) sending a final update SMS message comprising an indication that a subscriber action is required.

DESCRIPTION OF THE PREFERRED EMBODIMENTS

Figure 1:
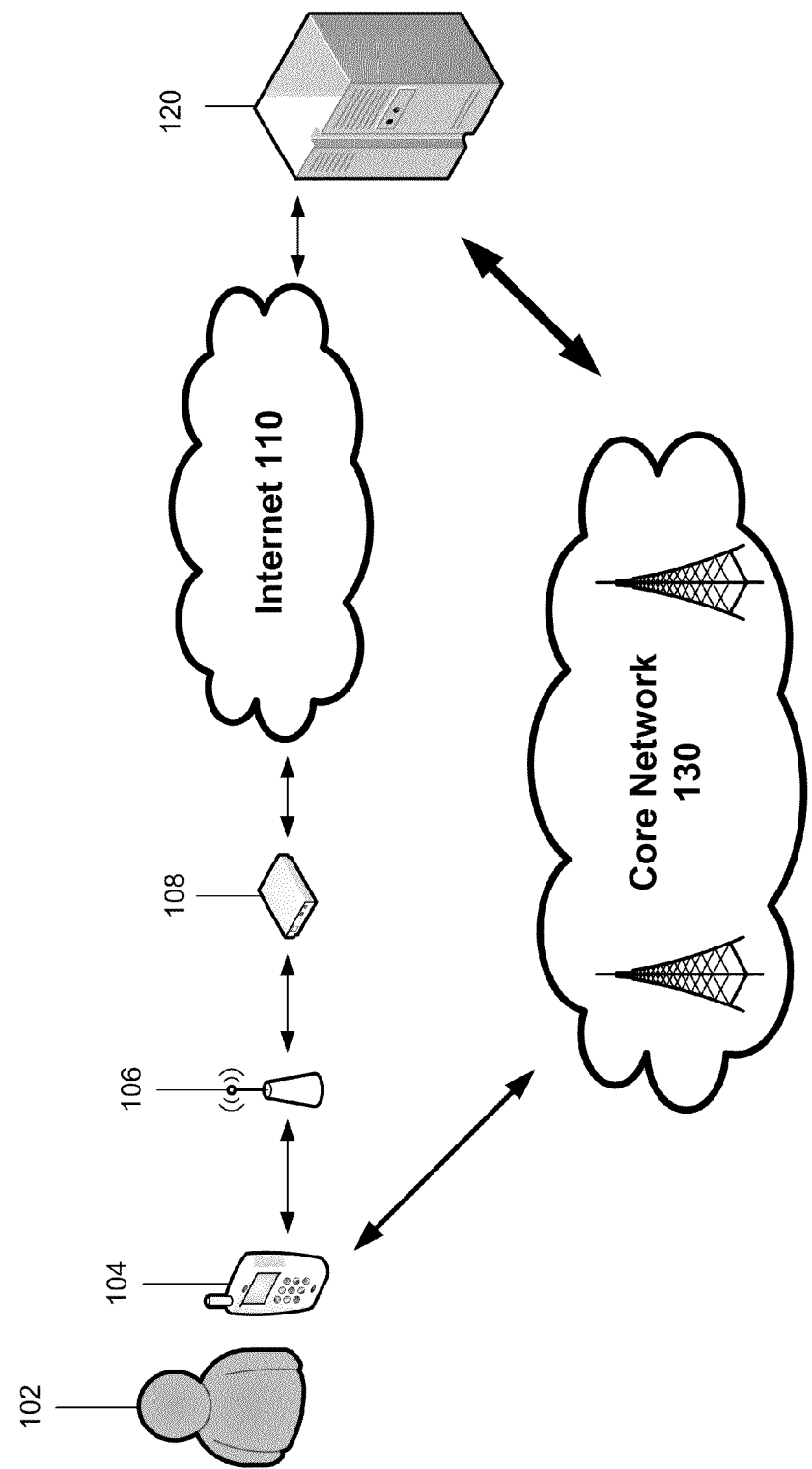
FIG. 1 illustrates a network system including a femtocell access point.

FIG. 1 illustrates the overall telecommunications system including a femtocell access point. User 102 typically uses subscriber equipment 104, such as a mobile telephone, to communicate over core network 130 to telecommunications service 120. Telecommunications service 120 routes the user communication as needed. External client modules may reside on telecommunications service 120 to provide additional processing of communications as directed by external clients. In the preferred embodiment, core network 130 is a cellular telephone network.

Femtocell access point (FAP) 106 connects to modem 108 in order to communicate through Internet 110 to telecommunications service 120. In addition to connecting through core network 130, subscriber equipment 104 can use (FAP) 106 to communicate to telecommunications service 120.

Figure 2:
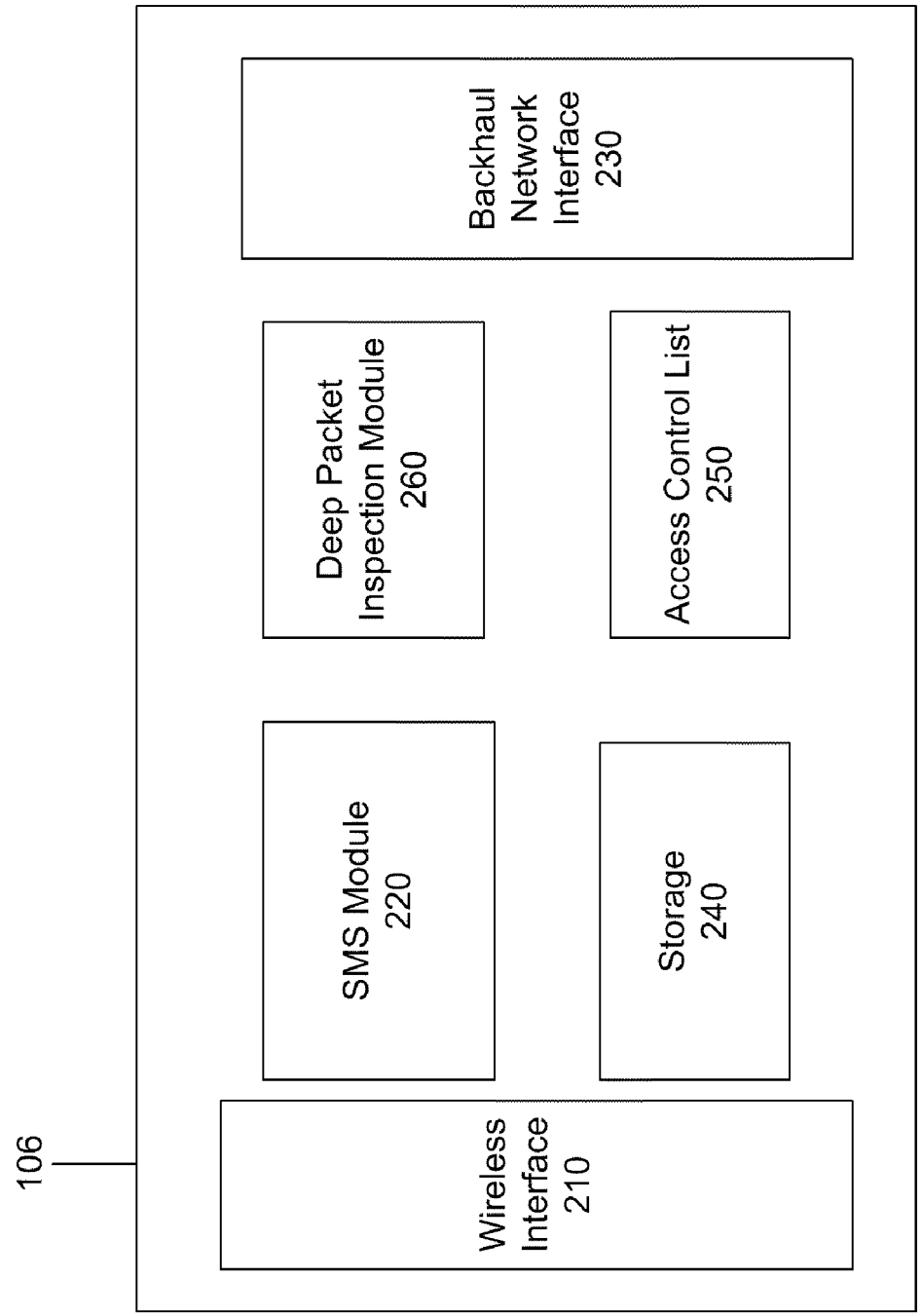
FIG. 2 illustrates a general block diagram of a femtocell access point.

The proposed system modifies a femtocell 106 with modules presented in FIG. 2. Femtocell 106 hosts the functionalities to perform services defined by the standards, including wireless interface 210 and backhaul network interface 230. SMS module 220 can create or terminate SMS messages from scratch. SMS module 220 also relays the outgoing SMS messages to telecommunications service 120. Termination of SMS messages in femtocell may be performed with the capability of Deep Packet Inspection (DPI) module 260.

DPI module 260 inspects the type and content of the packet. DPI first determines the source and destination from the header and then inspects the payload to see the type and content of the packet. In this case, DPI module 260 only applies a ruleset to detect SMS messages, which does not require much processing power.

SMS module 220 can also delay the incoming SMS and store it in storage memory 240. Storage memory 240 may also contain pre-configured SMS messages.

SMS module 220 checks Access Control List (ACL) 250, which shows the connected MSs/UEs, then determines where to send the incoming SMS. ACL 250 also serves as the access list of mobile subscribers. Since femtocells are in the customer premises, femtocell owner may allow certain subscribers to use its femtocell and its services and may reject connection requests of others. Also, a femtocell owner or operator may utilize some portion of its backhaul bandwidth for any subscriber.

Overall System

This added capability plus embedded SMS alert in all handsets enables applications to be deployed via this newly defined femtocell. Applications include but not limited to Home Zone Indication
Femtocell ACS Management
Inhome Notification
Unauthorized user Notification
Presence Service
Ticket Number SMS Service Home Zone Indication A user that connects to a femtocell has to be notified, because getting a connection from femtocell may be encouraged by the operator with incentives. Additionally, a different set of services may be available through femtocell than those available through the core network. As a result, a femtocell user has to find out when it is connected to a femtocell. Sending an SMS after the connection is approved is one effective way to notify the user. This SMS is called home zone indication and can be generated with SMS module 220 in femtocell 106.

In the same manner, a femtocell user has to learn when he leaves the femtocell, if he is getting away from the femtocell, or if the femtocell connection is broken. If the connection to the femtocell is broken, a notification mechanism is performed by the core network. However for the former case, when the femtocell is triggered for handover, the femtocell may notify the user via SMS.

Femtocell ACS Management

Femtocell services are proposed with two different access models: Open Access Model and Closed Access Model. Open Access Model allows any subscriber to get access from the femtocell. Closed Access Model, only allows certain mobile subscribers and rejects others. In some deployment scenarios, in Closed Access Model, there could be a bandwidth limitation for any subscriber who is not in the preferred list. In any case, monitoring the subscriber identity at the beginning of the attach procedure is required and it is desirable to reject them at the femtocell level in order to prevent propagating the attach request connection to the telecommunications service. Hence, backhaul bandwidth consumption is omitted.

Typically, this type of preferred list creation can be done with an operator's element management system assistance or logging in to the femtocell via web browser to talk to a local web server in the femtocell. However, with the method and system introduced here, SMS messaging can be utilized to create a femtocell preferred list.

An SMS messaging scheme is introduced where the authorized owner of the femtocell sends an SMS message to another mobile subscriber's phone number. DPI module 260 interprets the SMS message and inspects the content. If it finds that the SMS is in the desired format, it terminates the SMS message and sends back the content to SMS module 220. SMS module 220 updates the access control list 250 with the contents and sends back a confirmation message to the mobile subscriber. Telecommunications service 120 may pull or femtocell 106 may push this information to the operator's data base. If the operator's database has an SMS server that has the ability to update the database with SMS content, then mobile subscribers can uses that address in the beginning, and DPI module 260 does not terminate the SMS message but relays it to the SMS server of the operator's database at the same time gives back the SMS content to SMS module 220 for it to update access control list 250 in femtocell 106. Confirmation to the mobile subscriber may be right away or upon receiving a confirmation from the operator's database. In this case, there will be no need to additionally update the operator's database.

Inhome SMS Notification

A user who wishes to put a "post-it" note to a particular user only when that user arrives to the customer premises sends a SMS with a code via the femtocell. User 1 connecting to the femtocell sends an SMS to user 2 with a specific code ("home") or time ("19:00") or both. The former condition states that user 1 sends a note to user 2 which will be delivered only when user 2 arrives home. The latter condition states that the message will be delivered to user at 19:00 pm anywhere or only at home if "home" is in code as well.

In order to enable this scenario, first DPI module 260 detects the SMS and looks at the code. If code is for example "home," then it notifies SMS module 220 with the SMS content. SMS module 220 checks access control list 250 to see if user 2 is in the home. If user 2 is not home, SMS module 220 stores the message in storage 240. When user 2 arrives at home, SMS module 220 is notified from ACL 250 and SMS module 220 checks storage 240 for any SMS message to be delivered.

If the SMS has time component in the code, SMS module 220 records an event and stores the SMS in storage 240. When the time comes, SMS module 220 sends the message to the user via either core network 130 or through FAP 106 depending on where user 2 is at that time. If the code has also home component, SMS module 220 only sends the SMS when user 2 is at home at that time, otherwise it discards the SMS. Storage 240 stores the SMS messages until a pre-defined lifetime.

Note that Inhome SMS services most of the time do not consume Core Network Resources and the telecommunications operator is not aware of the number of SMS messages sent. Hence, this can be an add-on feature and can be managed and priced accordingly.

Unauthorized User Notification

A femtocell has the ability to trigger an SMS message which can directly open a communication channel to a handset. The handset alerts the user when the SMS message arrives via ring or vibration. This ability can be utilized for other scenarios. In one scenario, a femtocell may be leveraged as a warning for those who are in the vicinity of the customer premises. In order to enable such a service, femtocell has to operate in the Open Access Mode for a short time in a periodic manner.

First, the femtocell turns on open access mode and receives the access request signals from the subscribers who are in the vicinity. Then it checks the preferred list and filters out those are on it. After this, the femtocell SMS module triggers an SMS for those who are not on the list. The SMS module builds in a hysteresis for subscribers over time in order to avoid false triggers and spamming the same subscriber.

Examples of usage includes but not limited to following;
Security purposes: "You are trespassing, we recorded your number!"
Information purposes: "Please use back door for delivery!"
Advertisement purposes: "Discount on the shoes!"

Presence Services

As long as subscriber is attached to the femtocell, information can be extracted to offer additional services. For instance, services for senior people are offered by assigning a periodic SMS triggering event. SMS module 220 in the femtocell may send periodic SMS messages to the subscriber and wait for him to respond. If the SMS messages are not responded in a timely manner, SMS module 220 in the femtocell sends an outgoing SMS message either to emergency services or to a designated relative of the user. The femtocell may also correlate the signal strength readings of the user and if those don't change over time, it may trigger an emergency SMS message. This only consumes minimum backhaul bandwidth and operator's resources.

Also, presence services for a home are offered by monitoring the attach requests and detach request of subscribers. The following notifications can be sent to designated subscribers:

Send SMS out when (kid, mom, dad, etc.) arrives/leaves home
Send SMS out when there is nobody/somebody at home
Send SMS out with the time spent at home by an employee Ticket Number SMS Service A femtocell with reduced power (without violating the licensed spectrum requirements) can be used as a ticket number box. A subscriber who would like to get a service number may bring his handset to the vicinity of the box and get a number in SMS. This can be used in banks, shops, post offices, etc. Coverage is reduced less than 1 m and short term open access model can be utilized. Once a number has been requested, coverage may be provided by either the femtocell or the core network.

Figure 3:
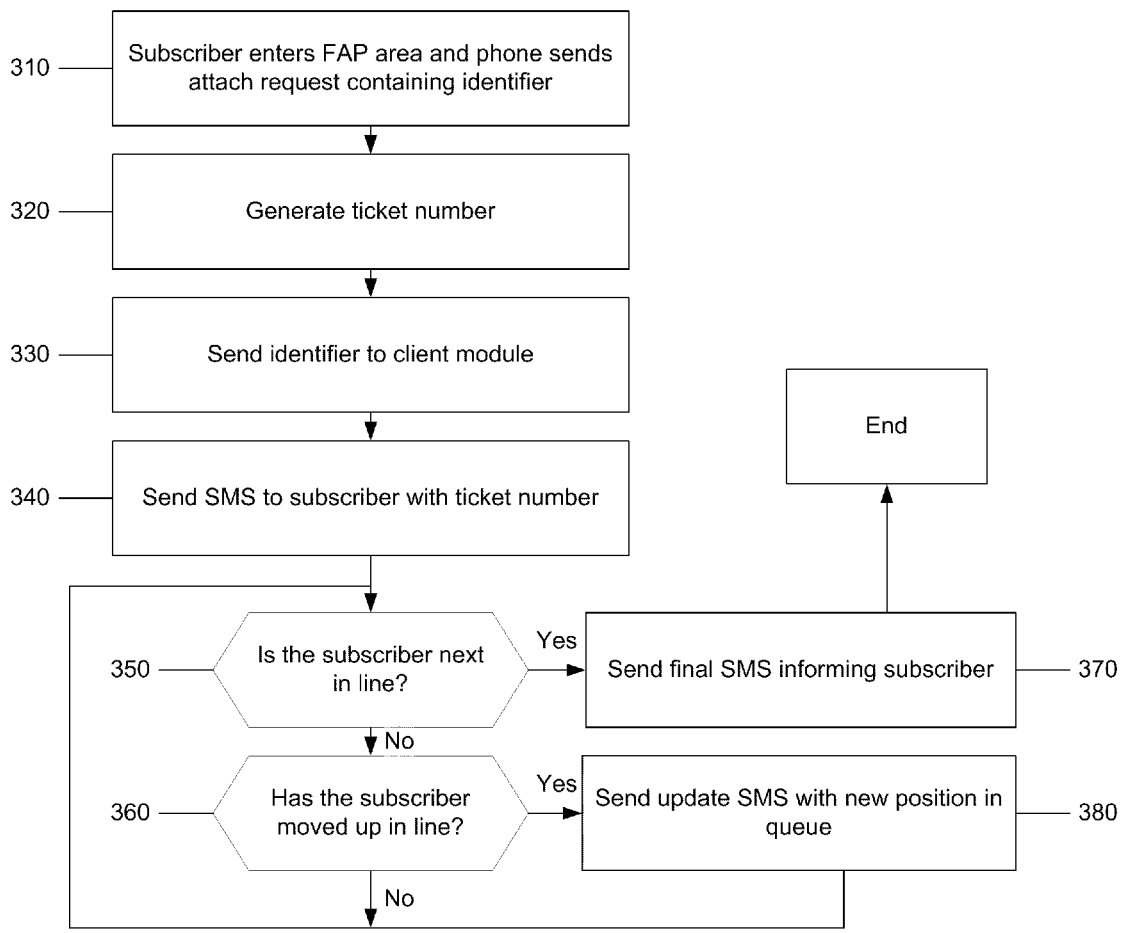
FIG. 3 illustrates a flowchart of the providing ticket number service with a femtocell access point.

The following functionalities are offered:
Ability to Trigger Next Ticket Number
Remove the Serviced Ticket Number
Notifies subscriber 0/1/5/10 minutes before his service is ready
Provides daily statistics Operation of femtocell access point 106 for ticket number service is depicted in FIG. 3. A subscriber enters the coverage area of FAP 106 and his phone sends an attach request with an identifier, such as the subscriber's telephone number (Step 310). FAP 106 generates a ticket number that is to be assigned to the subscriber (Step 320). Optionally, information such as the identifier and ticket number may be sent to an external client module, which may reside with the core telecommunications service (Step 330). Statistics can be gathered in a central database through the external client module. Next, the subscriber is sent an SMS message with his ticket number (Step 340). The initial SMS message, as well as subsequent messages pertaining to the ticket service, may be delivered either through FAP 106 or core network 130. As a result, subscribers don't need to wait in the premises and high-cost digital displays are not needed.

After the subscriber has been sent his ticket number, the ticket system periodically checks to see if the subscriber's ticket number is the next in line (Step 350). If the subscriber is the next in line, a final SMS message is sent informing the subscriber (Step 370). If the subscriber is not the next in line, the ticket system checks to see if the subscriber has moved up sufficiently in line (Step 360). If the subscriber has moved up sufficiently in line, an update SMS is sent to the subscriber with the new position (Step 380). If the subscriber has not moved up sufficiently in line, the ticket system waits before beginning checking again. In another embodiment of the invention, the update SMS describes additional information regarding the subscriber's position in line, such as an estimated wait time based on customer service time statistics.

A subscriber who no longer wants to use the ticket numbering service can notify FAP 106 to remove his or her ticket number from the queue and discontinue any further update SMS messages. The notification may be directly through FAP 106, through core network 130, or may be automatically detected. In one embodiment, a subscriber who does not respond to the SMS message notifying the subscriber that he or she is at the top of the line is automatically placed in a late queue. The subscriber can place themselves back in the main queue by sending an SMS message to the ticket service. After a certain time, subscribers in the late queue are automatically dropped from all queues.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Additionally, the present invention provides for an article of manufacture comprising computer readable program code contained within implementing one or more modules to provide ticket service through a Femtocell Access Point via Short Message Service. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) generating a ticket number in response to a request from a subscriber; (b) sending a notification to an external module; and (c) sending SMS messages to a subscriber.

CONCLUSION

A system and method has been shown in the above embodiments for the effective implementation of a Femtocell ticket service. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (e.g, CRT, LCD, etc.) and/or hardcopy (e.g., printed) formats. The programming of the present invention may be implemented by one having ordinary skill in the art of telecommunications.

The invention claimed is:

1. A method for providing ticket number service through a Femtocell Access Point (FAP) via Short Message Service (SMS), said method comprising the steps of:
receiving a request from a subscriber user equipment to attach to said FAP, said request containing an identifier associated with a subscriber;
generating a short term ticket number indicative of said subscriber's place in a queue for service;
sending an initial SMS message comprising said short term ticket number to said subscriber;
periodically checking to see when said subscriber has moved up in said queue for service;
sending an update SMS message comprising an indication of an updated position of the subscriber in said queue for service; when said subscriber has moved up to a first position of said queue for service, sending a final update SMS message;
removing said short term ticket number from said queue for service when the subscriber notifies said FAP; said short term ticket number also being removed from said queue for service after said final update SMS message is sent.

2. The method of claim 1, wherein said initial SMS message further comprises an indication of the position of the subscriber in the queue.

3. The method of claim 1, wherein said update SMS message comprises an indication that a subscriber action is required.

4. The method of claim 1, wherein said update SMS message comprises an indication of estimated wait time.

5. The method of claim 1, further comprising the step of sending a message with said identifier to an external client module.

6. The method of step 1, wherein said SMS message is sent through one of: said FAP or a core network.

7. The method of claim 1, wherein said identifier is a phone number.

8. The method of claim 1, wherein said subscriber user equipment is a mobile telephone.

9. A method for providing ticket number service through a Femtocell Access Point (FAP) via Short Message Service (SMS), said method comprising the steps of:
receiving a request from a subscriber's mobile telephone to attach to said FAP when said mobile telephone is brought within one meter of said FAP, said request comprising a telephone number associated with a subscriber;
generating a short term ticket number indicative of said subscriber's place in a queue for service;
sending a message to an external client module, said message comprising said telephone number and said ticket number;
sending an initial SMS message comprising said short term ticket number to said subscriber;
periodically checking to see when said subscriber has moved up said queue for service;
sending periodic update SMS messages comprising updated indications of the subscriber's position in the queue; and
sending a final update SMS message when said subscriber has moved up to the a first position of said queue for service, said final update SMS message comprising an indication that a subscriber action is required;
removing said short term ticket number from said queue for service when said subscriber notifies said FAP; said short term ticket number also being removed from said queue for service after said final update SMS message is sent.

* * * * *

UNITED STATES PATENT AND TRADEMARK OFFICE
CERTIFICATE OF CORRECTION

PATENT NO. : 8,275,400 B2  
APPLICATION NO. : 12/814934  
DATED : September 25, 2012  
INVENTOR(S) : Mustafa Ergen et al.

Page 1 of 1

It is certified that error appears in the above-identified patent and that said Letters Patent is hereby corrected as shown below:

Col. 8, line 14, delete "step" and insert therefore --claim--.

Signed and Sealed this  
Twelfth Day of February, 2013

Teresa Stanek Rea  
*Acting Director of the United States Patent and Trademark Office*